(12) United States Patent
Barr et al.

(10) Patent No.: US 8,783,612 B1
(45) Date of Patent: Jul. 22, 2014

(54) SLIDING PUCK FOR SEATING ASSEMBLY

(75) Inventors: Joseph B. Barr, Everett, WA (US);
Daniel M. Coon, Seattle, WA (US);
Richard N. Dainard, Stanwood, WA (US); Richard D. Griffin, Monroe, WA (US); Gregory W. Hewett, Marysville, WA (US); William B. Mann, Lake Stevens, WA (US); Thomas Eugene Robbins, Marysville, WA (US); Dean W. Sang, Everett, WA (US); Karl J. Schaefer, Everett, WA (US); Ralph M. Soto, Cinton, WA (US); Jody A. Taylor, III, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 835 days.

(21) Appl. No.: 12/954,210

(22) Filed: Nov. 24, 2010

(51) Int. Cl.
*B64D 11/06* (2006.01)
*A47B 91/06* (2006.01)

(52) U.S. Cl.
USPC ............... 244/122 R; 248/188.9; 248/346.11

(58) Field of Classification Search
USPC ............ 244/122 R, 118.1, 118.5; 292/251.5; 248/188.9, 346.11
See application file for complete search history.

(56) References Cited

U.S. PATENT DOCUMENTS

| | | | | |
|---|---|---|---|---|
| 3,623,184 A * | 11/1971 | Mazur | ...................... | 16/42 R |
| 3,731,963 A * | 5/1973 | Pond | ............................. | 292/144 |
| 3,750,872 A * | 8/1973 | Bobb | ............................ | 206/326 |
| 4,124,917 A | 11/1978 | Gilliland | | |
| 4,402,406 A * | 9/1983 | Weathers et al. | ............. | 206/326 |
| 5,220,705 A | 6/1993 | Bushey | | |
| 5,337,979 A * | 8/1994 | Bales et al. | ................. | 244/118.1 |
| 5,426,818 A | 6/1995 | Bushey | | |
| 5,557,824 A | 9/1996 | Bushey | | |
| 5,802,669 A * | 9/1998 | Wurdack | ........................ | 16/42 R |
| 5,991,974 A | 11/1999 | Carpinella | | |
| 6,219,882 B1* | 4/2001 | Olson | ...................... | 248/346.11 |
| 6,874,747 B2* | 4/2005 | Oh | ................................ | 248/430 |
| 7,073,629 B2* | 7/2006 | Gardner et al. | ............. | 182/180.2 |
| 7,232,096 B1* | 6/2007 | Ahad | ......................... | 244/118.6 |
| 7,334,758 B2* | 2/2008 | Williamson et al. | ........ | 244/118.6 |
| 7,510,224 B2* | 3/2009 | Bacco et al. | ................... | 292/340 |
| 2003/0042727 A1* | 3/2003 | Khubani | ...................... | 280/845 |
| 2007/0228215 A1* | 10/2007 | Hudson et al. | ............. | 244/118.1 |
| 2009/0321581 A1* | 12/2009 | Alizadeh Salimi et al. | .. | 244/213 |
| 2010/0050389 A1* | 3/2010 | Robinson et al. | ............. | 16/42 R |

* cited by examiner

*Primary Examiner* — Joseph W Sanderson
*Assistant Examiner* — Marc Burgess
(74) *Attorney, Agent, or Firm* — Yee & Associates, P.C.

(57) ABSTRACT

A device comprising a base, and a coupler connected to the base and adapted to attach the base to a seat assembly of a passenger aircraft. The seat assembly is connected to the coupler, wherein the base further comprises a slidable lining.

11 Claims, 8 Drawing Sheets

SLIDING PUCK FOR SEATING ASSEMBLY

BACKGROUND

1. Technical Field

The disclosure relates generally to devices used for moving objects. Still more particularly, the disclosure relates to devices that aid in sliding heavy objects.

2. Description of the Related Art

In the aircraft manufacturing process, a common part of constructing the aircraft may be to install seats, such as passenger seats, in the aircraft. Often, aircraft manufacturers might not design and build the seats, but rather may install pre-built seat assemblies provided to the aircraft manufacturer.

In the past, these seat assemblies may not have been extremely heavy, meaning that one or a few technicians, mechanics, assemblers, workers, or other personnel could manually lift the seat assemblies and then install them. However, over time, seat assemblies may have increased in weight. Currently, some seat assemblies may be, for example, without limitation, as heavy as about 600 pounds or more for a seat assembly. At this weight, even a team of technicians may have difficulty manually lifting and installing the seat assemblies.

A seat assembly may be considered one or more seats, sometimes built as an integrated unit, which may in some advantageous embodiments include more than one seat. In an advantageous embodiment, a single seat may be referred to as a "single seat assembly." In an advantageous embodiment an assembly of two seats may be referred to as a "double seat assembly." In an advantageous embodiment, an assembly of three seats may be referred to as a "triple seat assembly." Thus, a seat assembly may have as few as one seat, but may have as many as, for example, without limitation, four or more seats. Seat assemblies may be arranged in rows upon installation on an aircraft. In some advantageous embodiments, seat assemblies might be moved as a row. In other advantageous embodiments, a seat assembly might be, itself, referred-to as a row of seats. In any case, a seat assembly may, in some advantageous embodiments without limitation, be considered a single unit which may be moved as a single unit.

The process of lifting, installing, or both lifting and installing a seat assembly may be referred to as seat handling. Seat handling solutions continue to be elusive, especially for business class seat assemblies. Seat assemblies continue to grow in complexity and mass. Seat assembly complexity is also an issue, because complex seat assemblies or certain designs of seat assemblies may render maneuvering heavy seat assemblies more difficult.

These seat assemblies may be maneuvered in the airplane and may be handled several times before final installation in their designated spots within the aircraft. For example, seat assemblies may be loaded into the fuselage tube before final body join of the aircraft. In this case, the seat assemblies may be positioned out of the way of the location where the final body join takes place and then moved again thereafter. Thus, seat assemblies may be moved around again during the join process, as well as possibly during installation of other items. Once carpet is down and the passenger cabin prepared, seat assemblies may be moved into their final designated locations and locked down. Thus, these heavy seat assemblies may be moved several times during the installation process.

In the past, seat assemblies may have been brought into the airplane through a passenger door once the aircraft fuselage tube may have been joined and the aircraft moved into a final assembly position. Originally, seat assemblies may have been carried into the plane by the installation crew. However, the continuing increase in the weight of seat assemblies may make this practice impractical in some situations.

These seat handling processes may require more time and expense than desired. Furthermore, a seat assembly may be moved or replaced after initial installation, such as during maintenance. As a result, the time, expense, and difficulty to both assemble and maintain an aircraft may be increased. Accordingly, it would be advantageous to have a method and apparatus, which takes into account one or more of the issues discussed above as well as possibly other issues.

SUMMARY

An advantageous embodiment of the disclosure provides for a device comprising a base, and a coupler connected to the base and adapted to attach the base to a seat assembly of a passenger aircraft. The seat assembly is connected to the coupler, wherein the base further comprises a slidable lining.

An advantageous embodiment of the disclosure provides for a device comprising a base, and a coupler connected to the base and adapted to attach the base to an aircraft passenger seat assembly. An advantageous embodiment of the disclosure provides for a device. The device includes a base comprising a material suitable for sliding along a surface, a frame connected to the base, and a track connected to the frame, the track configured to hold a stud. One or more pistons that are configured to pop into the track such that when the stud may be present the stud may be prevented from moving out of the track.

An advantageous embodiment of the disclosure provides for a method of transporting a seat assembly. A seat assembly may be provided. An assembly may be formed by removably attaching a sliding puck to each leg of the seat assembly. The sliding puck may be attached to a transport holding device. The assembly may be shipped to a destination. The sliding puck may be detached from the transport holding device. The assembly may be positioned for installation into a vehicle. The sliding puck may be removed from each leg of the seat assembly.

An advantageous embodiment of the present disclosure provides for a method of transporting a seat assembly within a vehicle. An assembly may be formed by removably attaching a sliding puck to each leg of the seat assembly. The assembly may be positioned for installation into a vehicle. The sliding puck may be removed from each leg of the seat assembly.

The features, functions, and advantages can be achieved independently in various advantageous embodiments of the disclosure or may be combined in yet other advantageous embodiments.

BRIEF DESCRIPTION OF THE DRAWINGS

The novel features believed characteristic of the advantageous embodiments are set forth in the appended claims. The disclosure itself, however, as well as a preferred mode of use, further objectives and advantages thereof, will best be understood by reference to the following detailed description of an advantageous embodiment when read in conjunction with the accompanying drawings, wherein:

DETAILED DESCRIPTION

Figure 1:
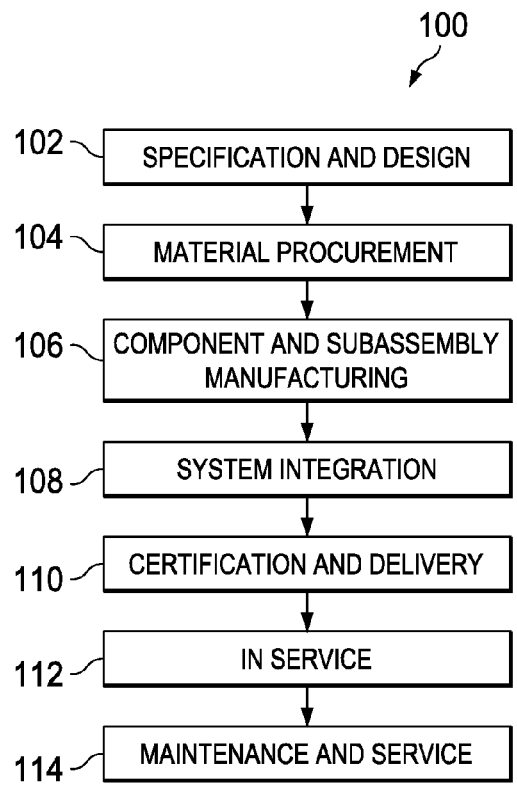
FIG. 1 is an illustration of an aircraft manufacturing and service method, in accordance with an advantageous embodiment.
Figure 2:
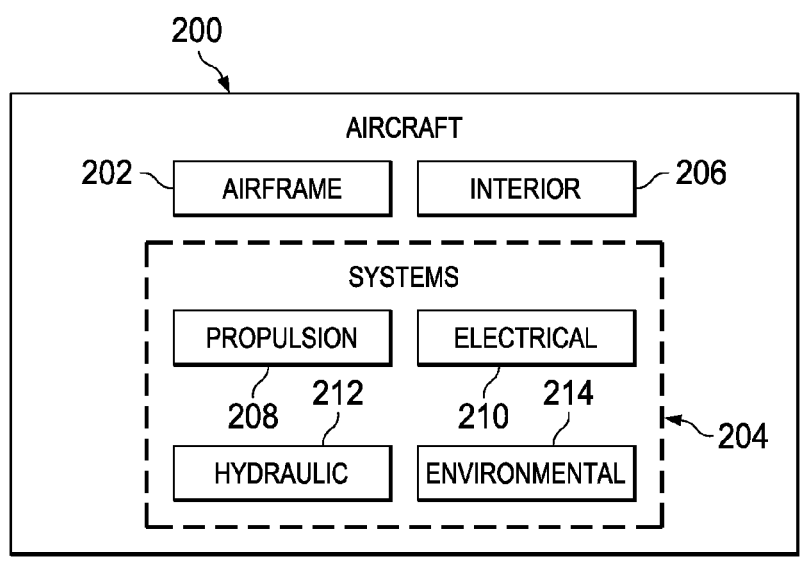
FIG. 2 is an illustration of an aircraft, in which an advantageous embodiment may be implemented.

Referring more particularly to the drawings, advantageous embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. "A number", when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of considerations. For example, it would be advantageous to have an improved method and apparatus for moving aircraft seat assemblies. As described above, in the past, seat assemblies may have been carried by hand. However, airplane position and particularly seat assembly weight may make this technique impractical.

The advantageous embodiments recognize and take into account the disadvantages of the prior art and set forth a device which may be low cost and also overcome the disadvantages presented above. In particular, the advantageous embodiments provide for a sliding puck. The sliding puck, possibly in conjunction with other sliding pucks deployed together on a single seat assembly, may be used to slide a seat assembly into place.

Stated differently, it would be advantageous to have an improved method and apparatus for moving aircraft seat assemblies. Accordingly, there is a need for a method and apparatus for minimizing the effort used to move heavy, complex seat assemblies, which overcomes the problems discussed above. Advantageous embodiments of the disclosure are intended to satisfy this need.

The sliding puck is used to move a seat assembly. The sliding puck might be considered a "seat assembly puck." However, the sliding pucks disclosed herein may be adapted to be connected to other objects in order to be able to slide said objects around more securely and more easily. The illustrations of FIG. 1 and FIG. 2 are not meant to imply physical or architectural limitations to the manner in which different advantageous embodiments may be implemented. Other components in addition and/or in place of the ones illustrated may be used. Some components may be excluded in some advantageous embodiments. Also, the blocks are presented to illustrate some functional components. One or more of these blocks may be combined and/or divided into different blocks when implemented in different advantageous embodiments.

Figure 3:
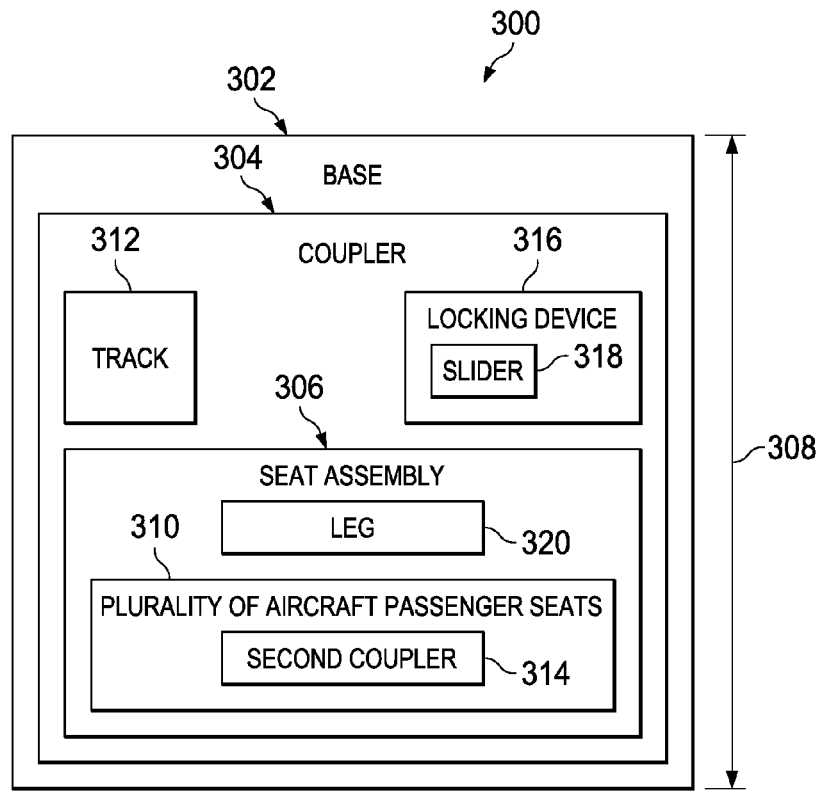
FIG. 3 is an illustration of a sliding puck, in accordance with an advantageous embodiment.

FIG. 3 is an illustration of a sliding puck, in accordance with an advantageous embodiment. The sliding puck 300 shown in FIG. 3 may be considered an abstract representation of the more detailed and non-limiting sliding pucks disclosed herein. Thus, sliding puck 300 shown in FIG. 3 illustrates that the sliding pucks disclosed herein may take many different forms and shapes, and may be made from a variety of different materials.

In an advantageous embodiment, sliding puck 300 may include, for example, without limitation, base 302 connected to coupler 304. In some non-limiting advantageous embodiments, coupler 304 (or coupler 900 of FIG. 9) may be referred to as a "tie down" or a "seat tie down." Coupler 304 in turn may be connected to a base of a seat assembly 306, which may be, for example, without limitation, used in an aircraft such as a passenger aircraft. When sliding puck 300 is connected to coupler 304 or to a seat assembly 306, the entire system may be referred to as assembly 308.

A seat assembly 306 may include a plurality of aircraft passenger seats 310. Coupler 304 may include a track 312 which may attach to a second coupler 314 of seat assembly 306. Coupler 304 may also include locking device 316 which may be used to lock seat assembly 306 in place to sliding puck 300. Locking device 316 may include a slider 318 adapted to slidably and removably attach to a leg 320 of the seat assembly 306. Other advantageous embodiments and arrangements are possible.

Figure 4:
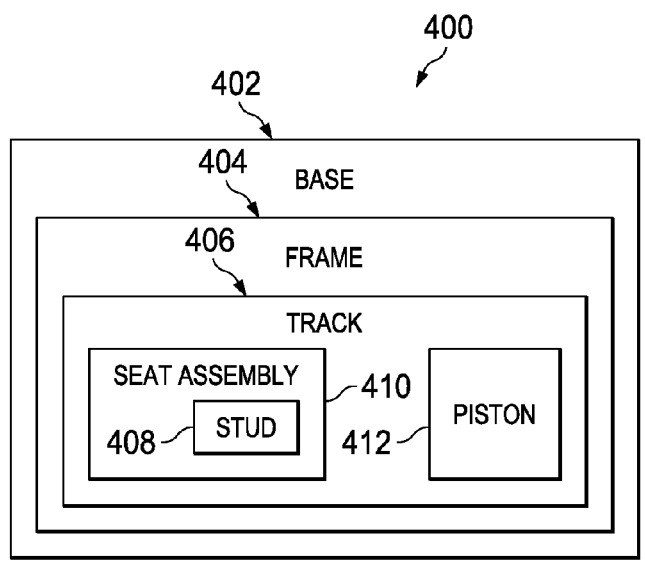
FIG. 4 is an illustration of a sliding puck, in accordance with an advantageous embodiment.

FIG. 4 is an illustration of a sliding puck, in accordance with an advantageous embodiment. Sliding puck 400 shown in FIG. 4 may be considered an abstract representation of the more detailed and non-limiting sliding pucks disclosed herein. Thus, sliding puck 400 shown in FIG. 4 illustrates that the sliding pucks disclosed herein may take many different forms and shapes, and may be made from a variety of different materials.

Sliding puck 400 includes base 402 which may be connected to frame 404. In turn, frame 404 may include track 406. Track 406 may be adapted for a stud 408 or other connectors such that stud 408 may be slid into track 406 and thereby secured with respect to sliding puck 400. Stud 408 may be part of a seat assembly 410. Sliding puck 400 may also include piston 412, which in an advantageous embodiment may extend into track 406 in order to prevent stud 408 or other connectors of seat assembly 410 from sliding off of sliding puck 400. Other advantageous embodiments and arrangements are possible.

Figure 5:
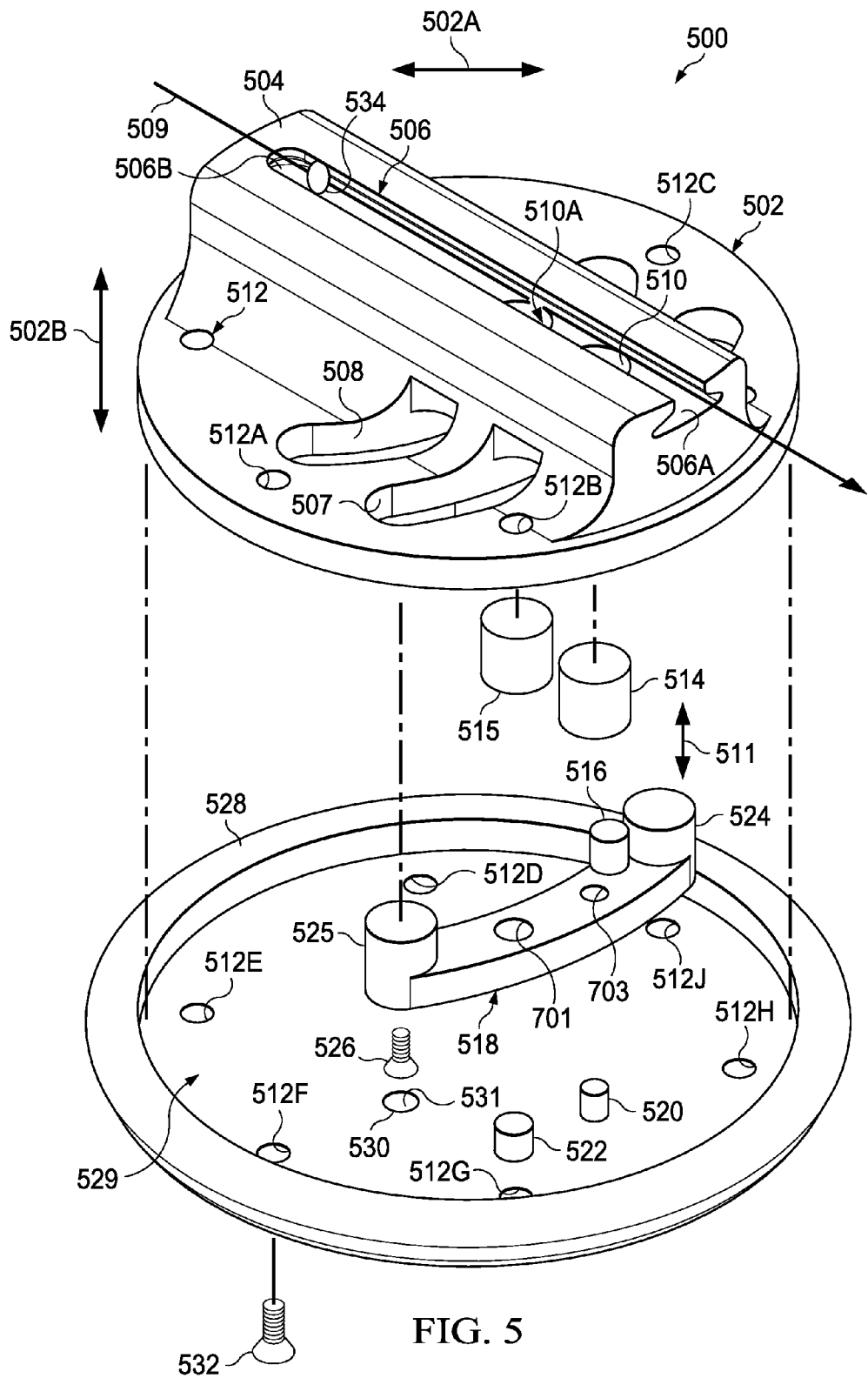
FIG. 5 is an illustration of a sliding puck, in accordance with an advantageous embodiment.

FIG. 5 is an illustration of a sliding puck, in accordance with an advantageous embodiment. Sliding puck 500 may be an example of one implementation of a sliding puck 300 shown in FIG. 3 or sliding puck 400 shown in FIG. 4.

Sliding puck 500 may, in an advantageous embodiment, be a sliding puck for seat assembly 306. Sliding puck 500 represents only one possible non-limiting advantageous embodiment. Other representations and parts of sliding puck 500 may be shown in FIGS. 6 through 10.

Sliding puck 500 includes frame 502. Frame 502 may be formed from any material of sufficient strength. These materials include, for example, without limitation, aluminum, plastic, polymers, fiber reinforced materials, composites, or other preferably non-ferrous materials, and/or other suitable materials. Frame 502 may have any shape, though in an advantageous embodiment it may be roughly circular or elliptical. In a particular, non-limiting advantageous embodiment, frame 502 may be about 6 inches in diameter and about 0.375 inches thick around the circumference, though many other dimensions are possible depending on intended use of sliding puck 500 or other considerations. As used herein, dimensions for a non-limiting example of a sliding puck might be presented. These dimensions are for example only, and may be varied according to any desired configuration.

Connected to and, in an advantageous embodiment, an integral part of frame 502, may be rib 504. Rib 504 may provide space for the slider assemblies detailed below, as well as provide a mount for a stud and/or other mounting mechanisms of seat assembly 306 or other objects. In a non-limiting advantageous embodiment, frame 502 may be about 1.75 inches wide 502A in radius and about 1.5 inches high 502B from the bottom of frame 502, though many other dimensions are possible depending on intended use of sliding puck 500 or other considerations.

Rib 504 may include track 506. Track 506 may be a slot along the center line of the rib, though the track 506 may have different shapes and sizes. Track 506 may allow a stud (see coupler 900 of FIG. 9) or other coupler on an object, such as seat assembly 306, to connect to rib 504 and hence frame 502. Track 506 may have an open end 506A which may be designated as the front, and may have a closed end 506B which may be designated as the back, though these designations and/or orientations might be reversed in other advantageous embodiments. In different advantageous embodiments, track 506 might be replaced by a raised projection (not shown), or a combination of a raised projection and a slot (not shown), such that the object to be connected to sliding puck 500 may be connected to frame 502. Together, rib 504 and track 506 may be referred to as a coupler, such as coupler 304 in FIG. 3.

In an advantageous embodiment, frame 502 may include one or more slots 507 and 508. Slots 507 or 508 may include one or more sliders, such as slider assembly 518, also referred to as slider assemblies, as detailed further below. In the advantageous embodiment shown in FIG. 5, two slots 507 and 508 are shown for two slider assemblies, but only one slider assembly 518 is shown in FIG. 5 to simplify the drawing. Configurations having two slider assemblies 518 and 519 are shown with respect to FIG. 7, FIG. 9, and FIG. 10.

In an advantageous embodiment, slot 508 may be about transverse to rib 504, but may be disposed at other angles, up to and including parallel to rib 504. In an advantageous embodiment, a second slot 507 may be provided, though additional slots may also be provided. In other advantageous embodiments, different arrangements may be provided to allow the sliders described below to slide.

In the advantageous embodiment shown in FIG. 5, two slots 507 and 508 are provided, with slots 507 and 508 being transverse to track 506, as referenced from axis 509. Slots 507 and 508 may be in one non-limiting advantageous embodiment, semicircular and about 0.625 wide. Slots 507 and 508 may have a common center about 2.0 inches to the rear of the nominal disk center point along axis 509 of rib 504, projected on the bottom of frame 502. Slots 507 and 508 may have curvatures determined according to the same or different radii with respect to a center point either on or off of sliding puck 500 (see also FIG. 7). Alternatively, each slot may have a different center point with respect to determining their respective radii. Thus, for example, the arcs formed by slot 507 and slot 508 may be identical with the same radius, making slider assemblies 518 and 519 identical. However, the centers of arcs for slider assembly 518 and slider assembly 519 might be off of frame 502 along an extension of axis 509. Fastener holes, such as fastener hole 512 might be adjusted accordingly in this advantageous embodiment. Slots 507 and 508 may be symmetrical or asymmetrical about the axis 509 of rib 504.

In an advantageous embodiment, hole 510 may be bored in track 506. In a non-limiting advantageous embodiment, this hole may be about 0.625 inches and may be in the center of track 506. Hole 510 may open at the bottom of frame 502. Hole 510 may allow for a piston 514, described further below, to move up and down through hole 510, as shown by arrows 511. In a non-limiting advantageous embodiment, two holes 510 and 510A are shown in FIG. 5. However, more holes may be provided or no holes may be provided. If no holes are provided, another mechanism might be used to block motion of objects disposed within track 506, such as a mechanical spring latch, a linkage, or some other mechanism for obstructing track 506.

In an advantageous embodiment, fastener hole 512 may be provided in frame 502. Multiple fastener holes 512, 512A, 512B, 512C, 512D, 512E, 512F, 512G, 512H, and 512J may be provided. Fastener holes, such as fastener hole 512, may allow frame 502 to be connected to other objects, such as base 528 described further below. In a non-limiting advantageous embodiment twelve fastener holes may be provided (two not shown), six fastener holes in frame 502 corresponding to six fastener holes in base 528, spaced around the periphery of the frame. This spacing may be symmetrical, asymmetrical, or have any convenient arrangement. More or fewer fastener holes may be provided depending on strength requirements, intended application, or other design considerations.

Piston 514 may be disposed between slider assembly 518 and frame 502. Piston 514 may be removably extendable through hole 510 and into track 506. When piston 514 extends into track 506, an object such as but not limited to a stud (not shown) within track 506 might be secured within track 506 because the piston 514 might block the object from slipping out of the front end 506A of track 506.

In an advantageous embodiment, piston 514 may be fashioned from aluminum round stock. However, piston 514 may take any desirable shape or size, and may be made from a variety of different materials, for example, without limitation, plastics, composites, metals, or any other material having a strength consistent with the desired application.

In an advantageous embodiment, a pocket (not shown) may be bored into the bottom of piston 514 in order to provide space for magnet 516. In different advantageous embodiments, a snap ring or some other technique, for example, without limitation, adhesive or epoxy, may be used to secure magnet 516 in place. Magnet 516 may be used in the operation of sliding puck 500, as described further below. In still another advantageous embodiment, piston 514 might itself be a magnet.

Slider assembly 518 may be arranged such that, when sliding puck 500 is assembled, slider assembly 518 may be disposed within slot 508. In the advantageous embodiment shown in FIG. 5 two slider assemblies (slider assemblies 518 and 519 shown in FIG. 7) may be provided, one for each slot. More or fewer slider assemblies may be provided, depending on the number of slots provided and the arrangement selected for actuating piston 514 and/or piston 515.

Slider assembly 518 may be constructed from any material, for example, without limitation, composites, plastics, materials, metals, or other substances. In an advantageous embodiment, slider assembly 518 is non-magnetic and non-ferrous. In a non-limiting advantageous embodiment, slider assembly 518 may be fashioned from acetal, may be about 0.375 inches thick, and may have an inner radius of curvature that fits in the radius of curvature of the corresponding slot, such as slot 508. In an advantageous embodiment, slider assembly 518 may traverse about one third of the length of slot 508 in going from one side of axis 509 to the other.

Figure 7:
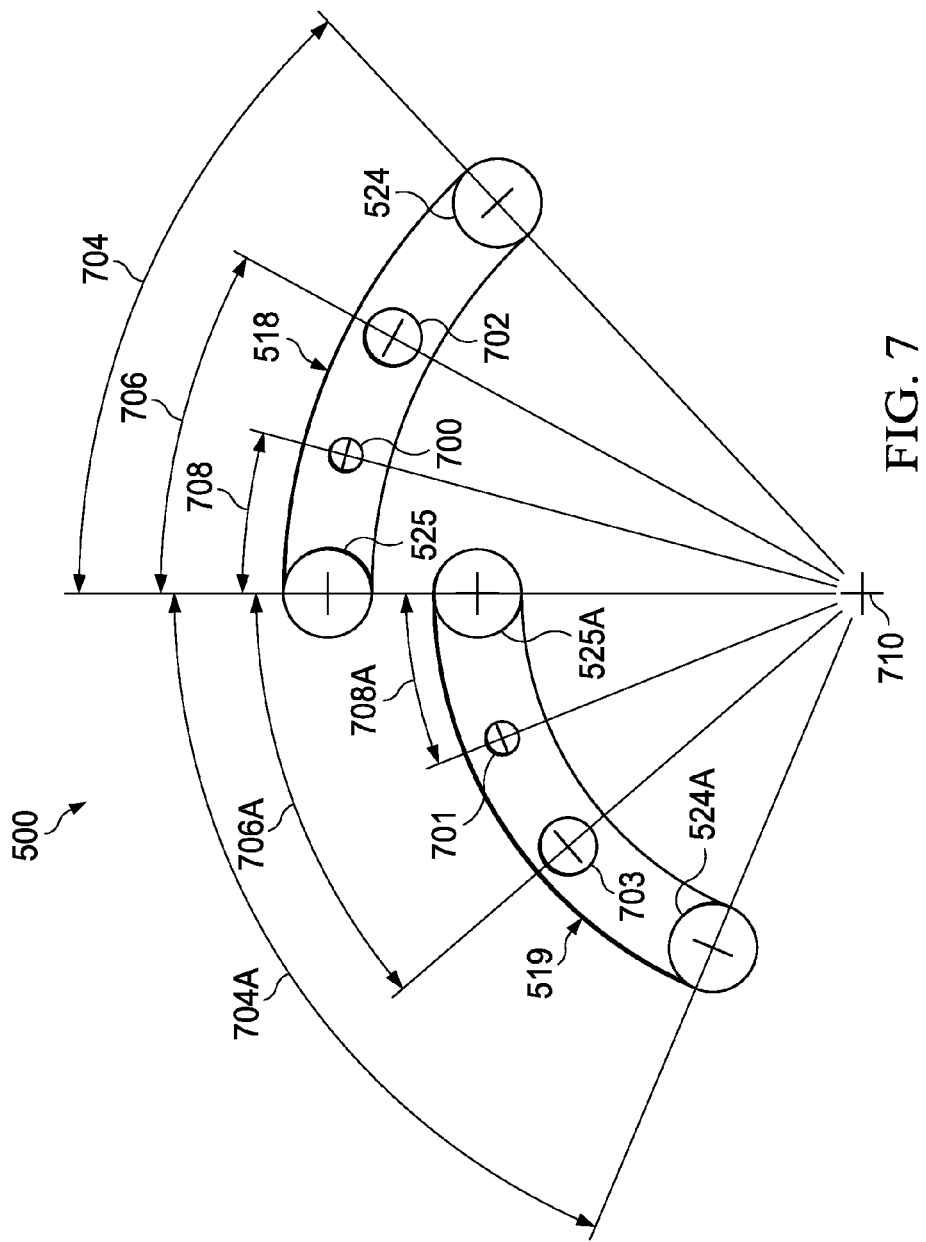
FIG. 7 is an illustration of slider assemblies that may be disposed within a sliding puck, in accordance with an advantageous embodiment.

In an advantageous embodiment, slider assembly 518 may have two pockets 701 and 703 (also shown in FIG. 7), one for magnet 520, and the other for plug 522, which may be, for example, without limitation, ferrous or magnetic. These pockets 701 and 703 may be spaced relative to a reference end on each slider assembly 518; as shown in FIG. 7.

Slider assembly 518 may be capped by knobs 524 and 525. In an advantageous embodiment, knobs 524 and 525 may be provided on each end of slider assembly 518. Knobs 524 and 525 may protrude above the top surface of frame 502 when the sliders are assembled to frame 502 and disposed within slot 508.

One of knobs 524 and 525 may be held in place with fastener 526. Fastener 526 may be fastened to slider assembly 518, but may not be attached to the base 528. If two knobs 524 and 525 are provided, then the other knob 524 may be secured with a fastener to slider assembly 518, described further below.

Base 528 may be attachable to frame 502 via one or more fastener holes, such as fastener hole 512. Base 528 may be made from any suitable material for sliding along a given surface. In a non-limiting advantageous embodiment, base 528 may be fashioned from a low friction material, for example, without limitation, polytetrafluoroethylene (PTFE), acetal, or any other composite, resin, plastic, metal, or other substance. In a non-limiting advantageous embodiment, a lining of base 528 may be fashioned from such materials. The lining may be considered a slidable lining because the lining contacts a surface as the sliding puck is slid across the surface. The lining may, in some advantageous embodiment, comprise any material having a coefficient of friction that allows a human to slide base 528, together with a connected seat assembly, across the surface.

In an advantageous embodiment, base 528 may be fashioned from a non-magnetic or non-ferrous material. In a non-limiting advantageous embodiment, acetal may be selected for durability and lower weight.

In a non-limiting advantageous embodiment, frame 502 may be inset about 0.375 inches with respect to base 528. The bottom surface (820 of FIG. 8) of base 528 may be somewhat saucer shaped to include a large radius across the center, though other shapes are possible.

Below inset 529 in base 528, into which frame 502 may be disposed, may be a pocket 530. In different advantageous embodiments, other pockets (not shown) may be disposed at the approximate ends of each slot, such as slot 508. Disk magnet 531 may be disposed in pocket 530. In an advantageous embodiment, disk magnet 531 may be captured in place by fastening down frame 502, though other fastening means may be used for example, without limitation, glue, fasteners, or others.

In a non-limiting advantageous embodiment, frame 502 may be assembled to base 528 using one or more of about ¼-20 flat head fasteners, such as fastener 532. Other fasteners of different shapes and materials may be used. Shear forces may be taken up by having the frame 502 inset in base 528, as shown at 529. Inset 529 may be configured so that fastener 532 may experience tension only, though other means for securing fastener 532 to frame 502 through base 528 may be used. In a non-limiting advantageous embodiment, nylon may be used for fastener 532 because nylon may be a non-marring material should fastener 532 loosen and protrude from the bottom while sliding puck 500 is in use. However, other non-marring materials may be used. Again, more than one fastener may be present, and each fastener might be sized, shaped, and composed of a material different than the other fasteners.

While some advantageous embodiments described in FIG. 5 may be used with variations of seat assembly 306, different arrangements may be provided. For example, coupler 304 may vary among different seat assemblies. Thus, for example, rib 504, track 506, and hole 510 might be arranged differently, or even replaced by some other coupler. In any case, a coupler is provided on or contiguous with frame 502 and/or base 528 such that an object may be secured to sliding puck 500.

Attention is now turned to an advantageous embodiment for assembling sliding puck 500. The following assembly technique is an example, only, as other assembly techniques might be used.

Sliding puck 500 may be assembled by first inserting pistons 514 and 515 in their respective holes 510 and 510A, non-magnet end first. Slider assemblies 518 and 519 (FIGS. 7, 9, and 10) may be fit to their respective slots 507 and 508. Knobs 524 and 525 on slider assembly 518 may protrude above the surface of frame 502. Disk magnet 531 and magnet 520 may be lightly pressed into base 528 or the bottom of slider assembly 518, respectively. Base 528 may be fit over frame 502 and fastener holes 512, 512A, 512B, 512C, 512D, 512E, 512F, 512G, 512H, and 512J. While fitting base 528 over frame 502, care is taken to locate disk magnet 531 and magnet 520 relative to slider assembly 518. Fasteners, such as fastener 532, may be inserted and tightened once the other components are aligned.

Attention is now turned to a non-limiting example of use of sliding puck 500. The following example might be varied for other arrangements of sliding puck 500.

As shown later in FIGS. 7, 9, and 10, sliding puck 500 may have two slider assemblies 518 and 519, each with its corresponding piston 514 and 515. Slider assemblies 518 and 519, and their corresponding pistons 514 and 515, may be at different distances from the center of sliding puck 500 along the track. A stud 408 may be disposed at different lengths at the rear of the seat assembly legs (not shown) relative to a length of track 506. Two pistons 514 and 515 may accommodate a range of stud 408 positions. Piston 514 may be selected for a stud 408 that, when attached to track 506, may be disposed closer to track opening 506A (relative to other studs or connectors of a seat assemblies). Likewise, piston 515 may be selected for a stud 408 that, when attached to track 506, may be disposed further away from track opening 506A (relative to other studs or connectors of a seat assemblies).

Both of slider assemblies 518 and 519 may be actuated simultaneously, or separately. As one or both slider assemblies 518 and 519 are actuated, magnet 520 moves under magnet 516. Magnet 520 and magnet 516 may have the same polarities. These two magnets may repel each other, driving piston 514 into hole 510, thereby blocking track 506. Additionally, fastener 526 may move over disk magnet 530. Fastener 526 may have a magnetic polarity opposite disk magnet 530, and/or fastener 526 may be a ferrous material. In either case, fastener 526 is pulled towards disk magnet 530, thereby locking slider assembly 518 in place so that slider assembly 518 does not slide back toward the other end of slot 506 unless slider assembly 518 is deliberately actuated otherwise. Other slider assemblies, if present, may operate in a similar fashion.

Figure 9:
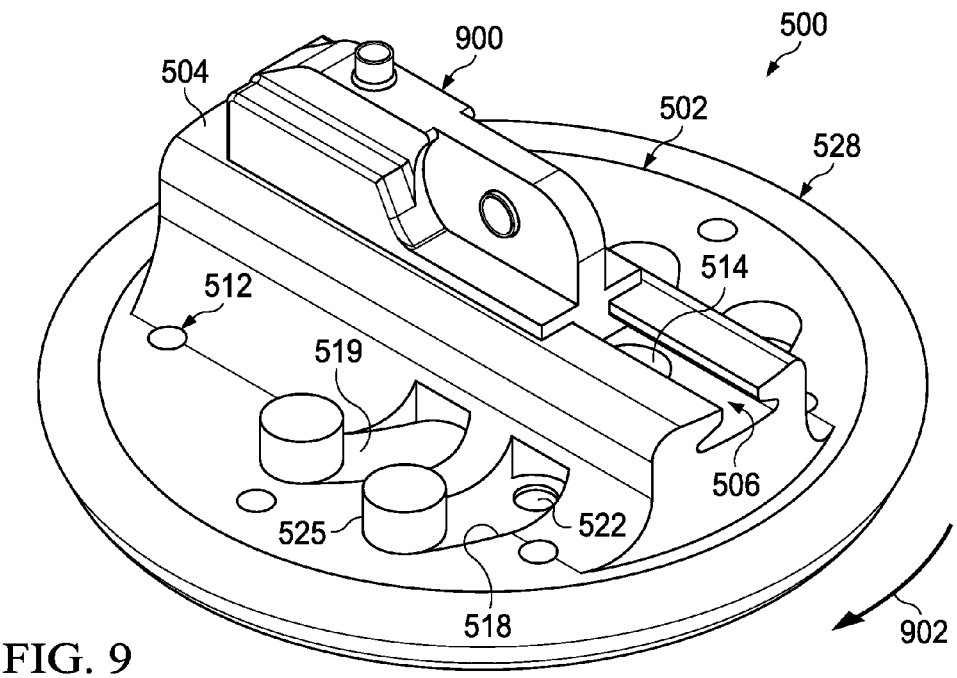
FIG. 9 is an illustration of a sliding puck together with a seat assembly coupler, in accordance with an advantageous embodiment.

An object, such as stud 408 of FIG. 4 or coupler 900 of FIG. 9, within track 506 might be blocked by one or both of pistons 514 and 515. Whichever piston, 514 and/or 515, is free may pop up or both will pop up if both are free. An object (stud 408 and/or coupler 900) at the front of the seat assembly 306 legs may be, for example, without limitation, the same as other couplers on seat assembly 306, including a single stud that slides into the seat assembly track. However, different arrangements may be present, and sliding puck 500 may be configured accordingly.

Thus, in an advantageous embodiment, an object (stud 408 and/or coupler 900) may be positioned about over the center of sliding puck 500. One or more pistons, such as for example, without limitation, piston 514 or 515, may block the object (stud 408 and/or coupler 900) in a spot within track 506 such that the coupler 304 will not move outside of track 506. This arrangement is also shown in FIG. 9.

In an advantageous embodiment, a spacer block 534 may be installed in or near track 506 in order to shorten track 506. In this manner, coupler 304 may be positioned desirably, such as at the center of the sliding puck 500. Spacer block 534 may be placed such that an object coupled to track 506 might have a limited range of motion between spacer block 534 and piston 514 and/or 515 within track 506.

In an advantageous embodiment, slider assemblies 518 and 519 may actuate in opposite directions. Thus, if both pistons 514 and 515 are either up or down, slider assemblies 518 and 519 may be on opposite sides of the axis 509 through track 506. This arrangement may be seen in FIG. 10. However, slider assemblies 518 and 519 may be configured to move in the same direction if, in a non-limiting embodiment, their respective slots 507 and 508 have sufficient separation to preclude or desirably reduce interaction between the various magnets shown.

As described above, pistons 514 and 515 may pop up due to the operation of magnet 516 and magnet 520. As either slider assembly 518 or 519 may be moved transversely in its corresponding slot 507 or 508, magnet 520 may be moved under magnet 516 in piston 514, placing like poles in close proximity, forcing piston 514 up.

With slider assembly 518 fully over to the active side of its slot 508, the centers of magnet 520 and magnet 516 may end up being slightly offset with respect to each other. In an advantageous embodiment, magnet 520 may be offset about half a diameter, or more or less, past magnet 516. This offset may tend to force slider assembly 518 sideways toward the active end of its slot 508, while piston 514 is forced up. Preferably, slider assembly 518 may stay on its active side, relative to the center line through track 506, in order to keep piston 514 up and thus block track 506. In this manner, sliding puck 500 may be prevented from sliding with respect to the seat assembly 306.

In an advantageous embodiment, to ensure slider assembly 518 holds the active position, disk magnet 531 may be provided at the active end of slot 508 in order to attract fastener 526 holding knob 525 on that end of slider assembly 518. To retract the piston 514, slider assembly 518 may be moved to the opposite side of its slot 508. This action may position plug 522 in slider assembly 518 directly under magnet 516 in piston 514, and thereby may hold piston 514 down and hold slider assembly 518 in the position which causes piston 514 to retract.

In an advantageous embodiment, for example, without limitation, four sliding pucks such as sliding puck 500 may be provided for any given seat assembly 306, though more or fewer sliding pucks may be used. In the case of four sliding pucks, once the four sliding pucks may have been positioned on the four corners of seat assembly 306, seat assembly 306 can be slid across surfaces and onto the aircraft.

Sliding puck 500 may be compatible with other seat handling equipment or techniques, such as the seat gantry described above. Because sliding puck 500 may be disk shaped, similar to a saucer sled, seat assemblies may slide in any direction, thus providing desired maneuverability within the confines of an aircraft cabin. Furthermore, sliding puck 500 may distribute the weight of a seat assembly 306, thereby reducing the chance that undesirable loads might be applied to the floor of an aircraft during installation.

As indicated above, sliding puck 500 may be varied according to various design or use considerations. For example, base 528 may be fashioned from different substances, for example, without limitation, ultra high molecular weight polyethylene (UHMW plastic) in order to resist abrasion. Furthermore, a configuration for base 528 may be varied according to an intended use for sliding puck 500. Sliding puck 500 also could be provided with an air input point (not shown) and concave or other recessed shape (edge 822 of FIG. 8) on the bottom of the base 528 to serve as an air bearing. While an air bearing may not be suitable for use on carpet, such a configuration may work well on smooth, non-permeable floors such as concrete or metal.

In an advantageous embodiment, both slider assemblies 518 and 519 may travel in the same direction instead of operating in opposite directions. In an advantageous embodiment, color coding may be provided to readily determine the "lock" and "unlock" orientations of sliding puck 500. Many other variations of sliding puck 500 and its assembly and use are possible.

Figure 6:
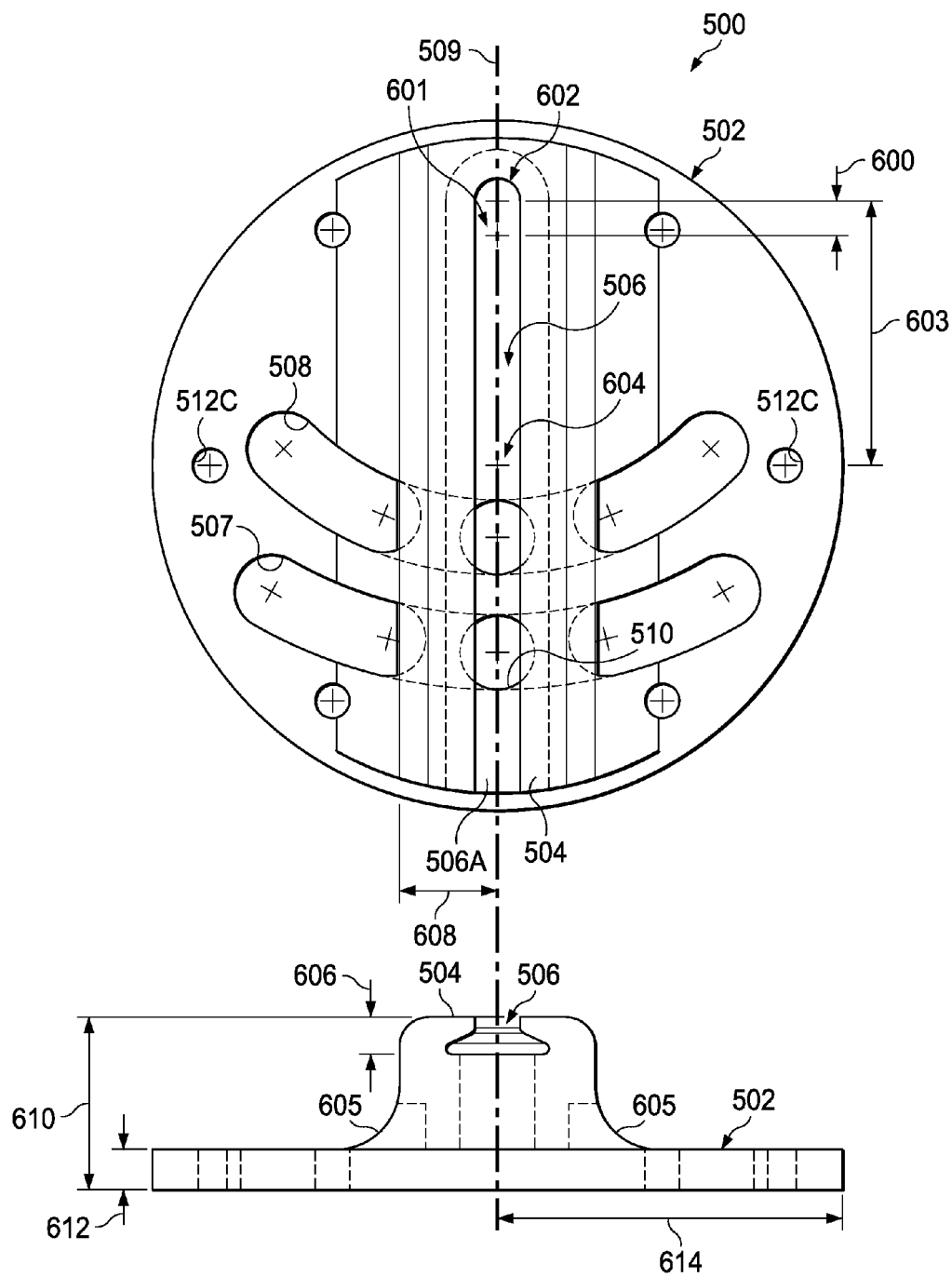
FIG. 6 is an illustration of a frame for a sliding puck, in accordance with an advantageous embodiment.

FIG. 6 is an illustration of a frame for a sliding puck, in accordance with an advantageous embodiment. FIG. 6 may represent a mechanical configuration of frame 502. FIG. 6 may represent a similar sliding puck to sliding puck 500 shown in FIG. 5. Therefore, different components of sliding puck 500 shown in FIG. 6 may share common reference numerals, and accordingly may share similar properties, functions, and uses.

FIG. 6 may illustrate a view of sliding puck 500 from above and from the side at the front end 506A of track 506. Slots 507 and 508 are shown, along with hole 510 that extends through frame 502 and opening at the base of track 506. Fastener holes, such as fastener hole 512C, are also shown, together with rib 504.

FIG. 6 also provides examples of dimensions for a particular advantageous embodiment. These dimensions may be varied in different advantageous embodiments, according to the object being used, the weight to be distributed, configuration of sliding puck 500, and other considerations. Thus, the dimensions provided may be an example only and are not necessarily intended to limit the disclosures herein.

In a particular advantageous embodiment, arrows 600 may indicate a distance forward from point 601, with the distance locating the remote center point 710 for the arcs describing slots 507 and 508 (see remote center point 710 in FIG. 7). Point 601 may be a center point from which a radius may extend that defines semicircular end 602. The distance indicated at arrows 600 may be about 0.25 inches. Arrows 603 may indicate a distance between center point 604 of frame 502 and point 601. This distance may be about 2.25 inches. In an advantageous embodiment, these dimensions may be presented in order to reference some or all distances to a single reference point, which is point 601 in this case. Fastener holes 512A and 512B may be shown for further reference to FIG. 5.

Flaring region 605 indicates where rib 504 may have a wider base where rib 504 is connected to frame 502. In an advantageous embodiment, this flaring region 605 may have a height of about 0.5 inches relative to a height of rib 504.

Arrows 606 may indicate a depth of track 506, which may be about 0.30 inches. Arrows 608 may indicate a width from an edge of rib 504 to a central axis 509 of track 506, which may be about 0.875 inches. Arrows 610 may indicate a distance from the bottom of frame 502 to the top of rib 504, which may be about 1.5 inches. Arrows 612 may indicate a height of frame 502, which may be about 0.375 inches. Arrows 614 may indicate a distance between the center of frame 502 and an edge of frame 502. This distance may be about 3.0 inches. Again, other dimensions are possible. Thus, other sizes and values may also be used for any of the components described herein.

FIG. 7 is an illustration of slider assemblies that may be disposed in a sliding puck, in accordance with an advantageous embodiment. FIG. 7 may represent a similar sliding puck to sliding puck 500 shown in FIG. 5. Therefore, different components shown in FIG. 7 may share common reference numerals, and accordingly may share similar properties, functions, and uses.

FIG. 7 may illustrate a view of slider assemblies 518 and 519 from above. Slider assemblies 518 and 519 may be represented by segments of two different circles with a common center. However, in other advantageous embodiments as indicated above, the circle segments may have different centers. Slider assemblies 518 and 519 may include knobs 524 and 525 and 524A and 525A, respectively, described above with respect to FIG. 5. Also shown are hole 701 for holding plug 522 (shown in FIG. 5), as well as hole 703 for holding magnet 520 (shown in FIG. 5), also described with respect to FIG. 5.

FIG. 7 also provides for dimensions for a particular advantageous embodiment. These dimensions may be varied in different advantageous embodiments, according to the object being used, the weight to be distributed, configuration of sliding puck 500, and other considerations.

Arrows 704 and 704A may indicate an angle between knobs 524 and 525 along slider assembly 518 relative to a remote center point 710, located on the axis of track 506, for the purpose of locating and defining an arc for slider assemblies 518 and 519. This value may be about 45 to about 70 degrees. Arrows 706 and 706A may indicate an angle between holes 702 and 703 and center of knobs 525 and 525A respectively relative to remote center point 710. This value may be about 25 to about 45 degrees. Arrows 708 and 708A may indicate an angle between holes 700 and 701 and center of knob 525 and 525A respectively relative to remote center point 710. This value may be about 10 to about 25 degrees. In an advantageous embodiment, plug 522 may be fashioned from steel and may be inserted in hole 700. In an advantageous embodiment, magnet 520 may be inserted in hole 702. Other sizes and values may also be used.

Figure 8:
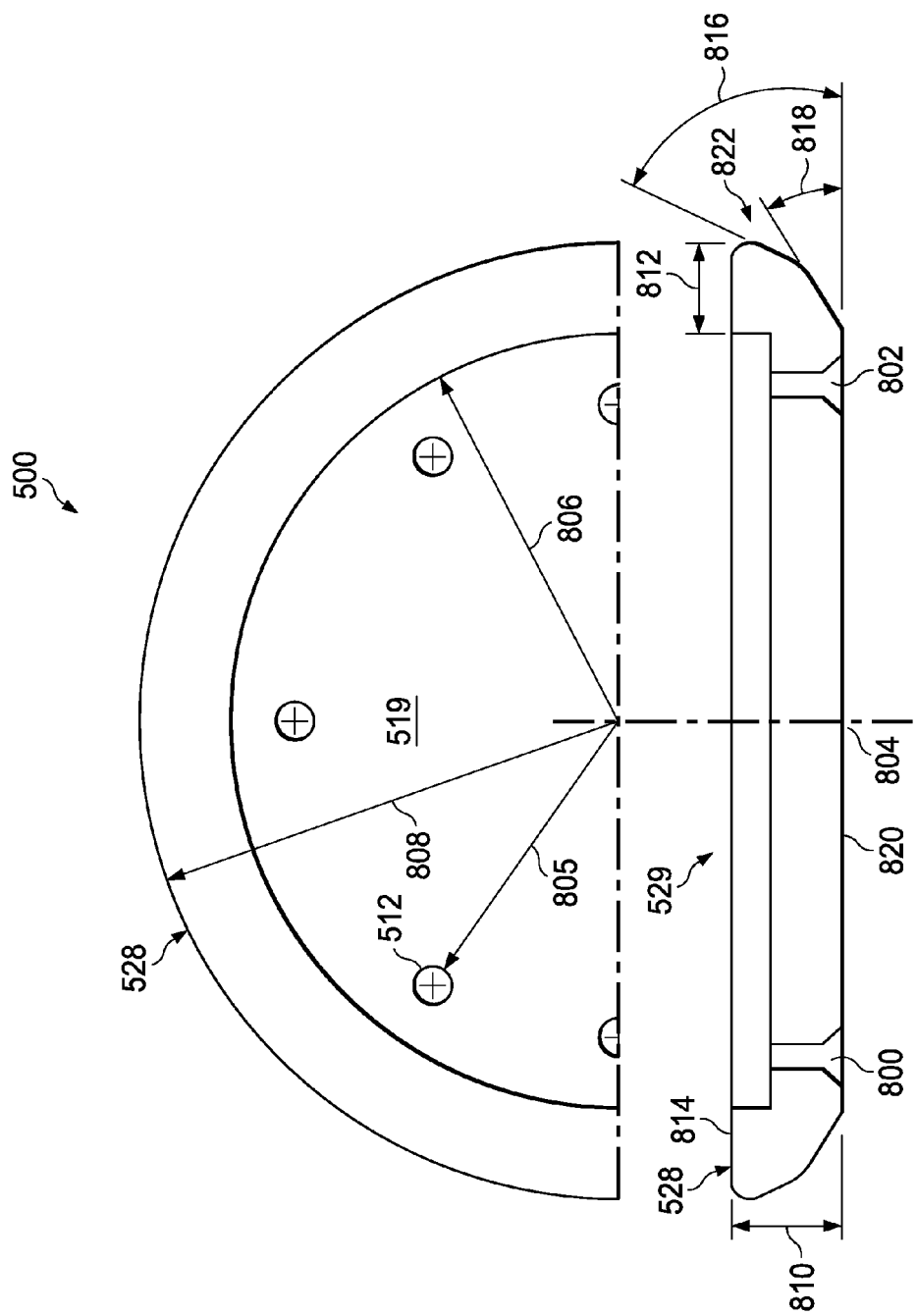
FIG. 8 is an illustration of a base for a sliding puck, in accordance with an advantageous embodiment.

FIG. 8 is an illustration of a base for a sliding puck, in accordance with an advantageous embodiment. FIG. 8 may represent a mechanical drawing for base 528 of FIG. 5 or base 402 of FIG. 4. The top view shows half of base 528 because base 528 may be, for example, without limitation, symmetrical. FIG. 8 may represent a similar sliding puck to sliding puck 500 shown in FIG. 5. Therefore, different components of the sliding puck 500 shown in FIG. 8 may share common reference numerals, and accordingly may share similar properties, functions, and uses.

FIG. 8 may illustrate a cross section of base 528. As shown in FIG. 8, base 528 may include a inset 529 in which slider assemblies 518 and 519 of FIG. 5 may be disposed. Fasteners 800 and 802 may be provided, which extend through inset 529, in order to secure frame 502 of FIG. 5 to base 528. Fasteners 800 and 802 may be provided at different angles, other than parallel to axis 804. As can be seen, base 528 may be saucer shaped at edge 822 in order to allow sliding puck 500 to more easily slide over imperfections of a surface or over small objects that might otherwise impede the progress of sliding puck 500 when being slid.

FIG. 8 also provides for dimensions for a particular advantageous embodiment. These dimensions may be varied in different advantageous embodiments, according to the object being used, the weight to be distributed, configuration of sliding puck 500, and other considerations. Thus, the dimensions provided may be an example only and are not necessarily intended to limit the disclosures herein.

Arrows 805 may indicate a distance from a center of sliding puck 500 to a fastener hole, such as fastener hole 512. This distance may be about 2.5 inches. Arrows 806 may indicate a distance from center of sliding puck 500 to about an edge of inset 529, thereby indicating a possible size of inset 529. This distance may be about 3.0 inches. Arrows 808 may indicate a distance from the center of sliding puck 500 to an outside edge of sliding puck 500. This distance may be about 3.75 inches. Arrows 810 may indicate a height of base 528. This distance may be about 1 inch. Arrows 812 may indicate a width of the outer rim or ledge 814 of base 528. This distance may be about 0.75 inches. Arrows 816 may indicate a desired radius, and may be about the same as the width of ledge 814, and may be about 0.75 inches. Angle 818 may indicate an approximate angle between the bottom surface 820 of base 528 and edge 822 of base 528. Angle 818 may be about 27 degrees. Any of these values may be varied, and the edge of base 528 may have other saucer shapes, may be dome shaped, may be block shaped, or have other shapes. Other sizes and values may also be used.

FIG. 9 is an illustration of a sliding puck together with a seat assembly coupler 900, in accordance with an advantageous embodiment. FIG. 9 may represent a similar sliding puck to sliding puck 500 shown in FIG. 5. Therefore, different components of the sliding puck 500 shown in FIG. 9 may share common reference numerals, and accordingly may share similar properties, functions, and uses.

FIG. 9 may illustrate a view of sliding puck 500 from an angle, with the viewer looking downwardly. The various parts of sliding puck 500 may be seen, including frame 502, base 528, fastener hole 512, knob 525, plug 522, rib 504, track 506, slider assemblies 518 and 519, and piston 514. In the advantageous embodiment of FIG. 9, piston 514 may be engaged such that seat assembly coupler 900 may not exit out of track 506. A stud 408 (not shown) on seat assembly coupler 900 may be disposed within track 506. In this manner, seat assembly coupler 900 is secured within track 506 so that sliding puck 500 may not slide off of seat assembly coupler 900 while sliding puck 500 is being pushed across a surface 902.

In the exemplary, non-limiting advantageous embodiment of FIG. 9, seat assembly coupler 900 may be a rear seat coupler which may be slid onto track 506 of sliding puck 500. Front seat couplers may also be used. A front seat coupler, which might be a stud, may slide in track 506 of sliding puck 500. In the locked position, the front seat coupler may be positioned within track 506 of sliding puck 500 so that the front seat coupler may not slide off of track 506.

In use, seat assembly coupler 900 may be connected to a leg or leg frame on a seat assembly 306. The weight of the seat assembly 306 is communicated through seat assembly coupler 900 and onto surface 902. Seat assembly coupler 900 may distribute the weight of the seat assembly 306 across the portion of base 528 that is in contact with surface 902. Seat assembly 306 may then be slid across surface 902 using sliding puck 500.

In an advantageous embodiment, a second piston 515 may be present (FIG. 5 and FIG. 10), but would be disposed below seat assembly coupler 900. Seat assembly coupler 900 may block the second piston from entering track 506, or may possibly also extend into track 506. In either case, seat assembly coupler 900 may be prevented from sliding with respect to track 506 at least by piston 514, and accordingly seat assembly coupler 900 remains secured to sliding puck 500. Note that because piston 515 may be magnetically actuated, blocking operation of piston 515 with coupler 900 may avoid maintenance issues with respect to sliding puck 500 or to the components therein. This advantage might not exist with respect to mechanical actuation of piston 515 without the complexity of springs or other moving parts.

Figure 10:
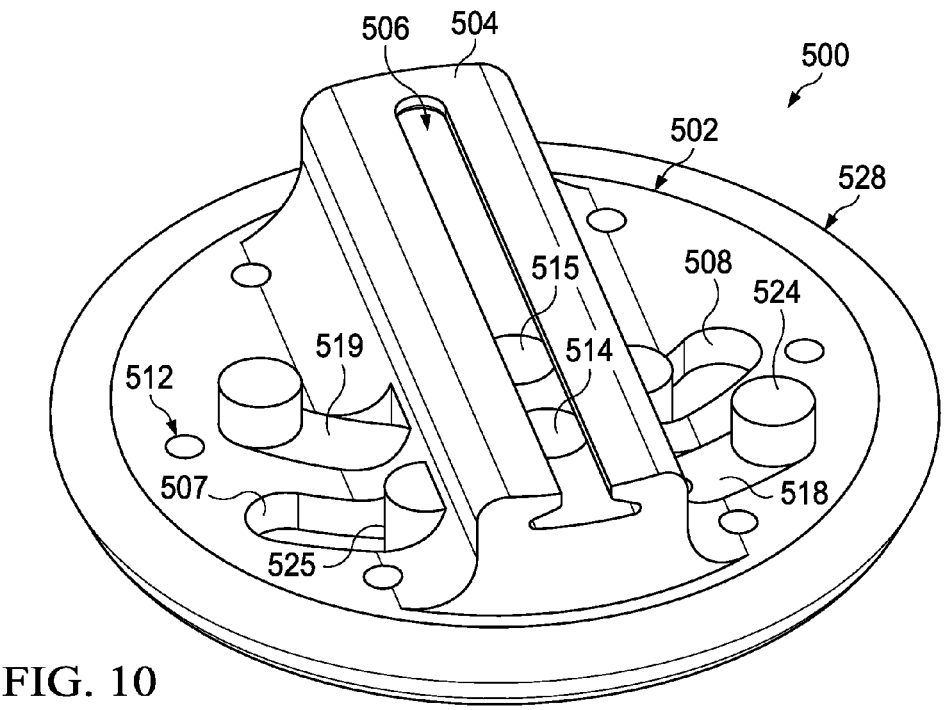
FIG. 10 is an illustration of a sliding puck, in accordance with an advantageous embodiment.

FIG. 10 is an illustration of a sliding puck, in accordance with an advantageous embodiment. FIG. 10 may represent a similar sliding puck to sliding puck 500 shown in FIG. 5. Therefore, different components of the sliding puck 500 shown in FIG. 10 may share common reference numerals, and accordingly may share similar properties, functions, and uses.

FIG. 10 may illustrate a view of sliding puck 500 from an angle, with the viewer looking downwardly. The various parts of sliding puck 500 may be seen, including frame 502, base 528, fastener hole 512, slots 507 and 508, knobs 524 and 525, rib 504, track 506, slider assemblies 518 and 519, and pistons 514 and 515. In the advantageous embodiment of FIG. 10, slider assemblies 518 and 519 may be engaged in opposite directions as described with respect to FIG. 7. In this orientation for this particular advantageous embodiment, both pistons 514 and 515 may be lowered so that the tops of pistons 514 and 515 may be flush with or lower than the bottom of track 506. In this orientation, seat assembly coupler 900 of FIG. 9 may slide with respect to track 506 (or sliding puck 500 may be removed from seat assembly coupler 900 of FIG. 9).

Figure 11:
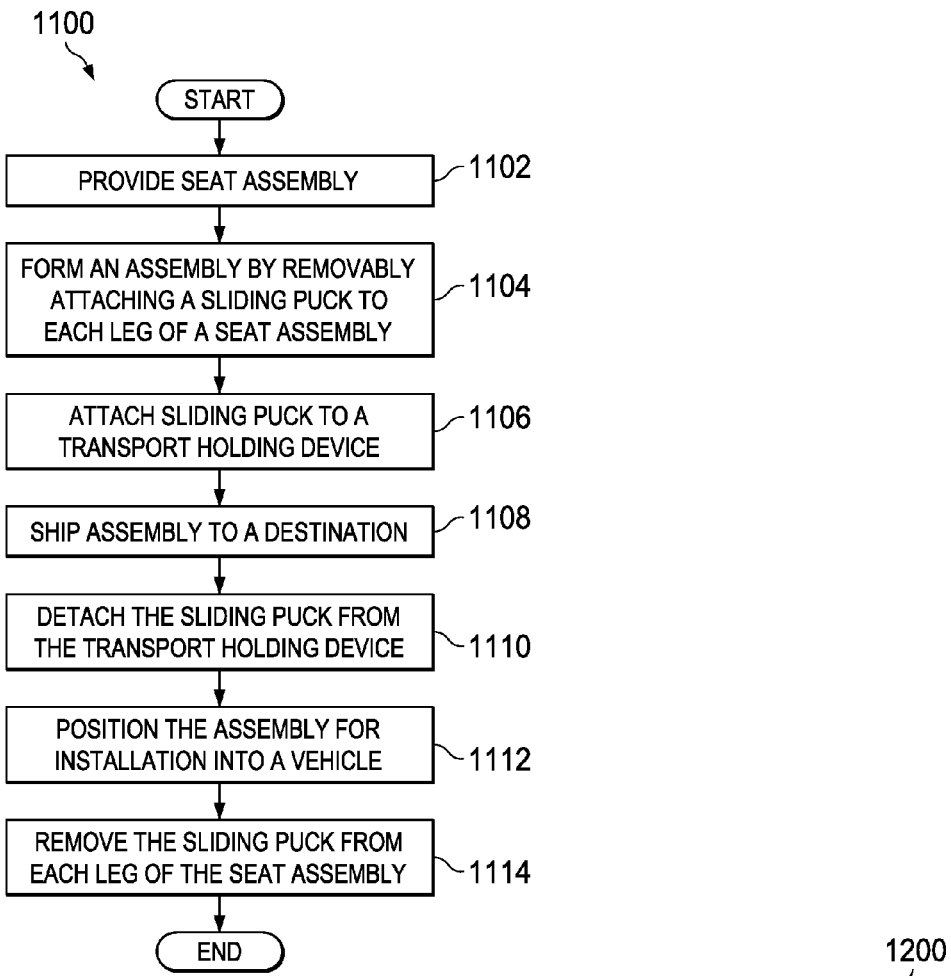
FIG. 11 is a flowchart of a process for transporting a seat assembly, in accordance with an advantageous embodiment.

FIG. 11 is a flowchart of a process for transporting a seat assembly 306, in accordance with an advantageous embodiment. The illustrative process shown in FIG. 11 may be implemented using a sliding puck, such as sliding puck 500 described with respect to FIGS. 3 through 10. The process shown in FIG. 11 may be implemented by persons or by one or more machines. The process 1100 begins with providing a seat assembly 306 (operation 1102). Then an assembly 308 may be formed by removably attaching a sliding puck, such as sliding puck 500, to each leg of a seat assembly (operation 1104). In an advantageous embodiment, the sliding puck may be sliding puck 300 of FIGS. 1 through 8. The sliding puck is then attached to a transport holding device (operation 1106). The assembly 308 is then shipped to a destination (operation 1108). The sliding puck is detached from the transport holding device (operation 1110). The assembly 308 is positioned for installation into a vehicle (operation 1112). The vehicle may be an aircraft, automobile, truck, maritime vehicle such as a ship or boat, a space vehicle, or any kind of vehicle. The sliding puck is removed from each leg of the seat assembly (operation 1114). The process terminates thereafter.

Figure 12:
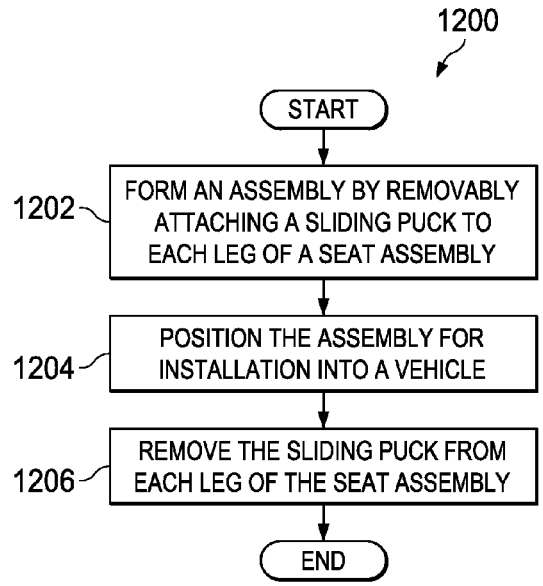
FIG. 12 is a flowchart of a process for transporting a seat assembly, in accordance with an advantageous embodiment.

FIG. 12 is a flowchart of a process for transporting a seat assembly 306, in accordance with an advantageous embodiment. The illustrative process shown in FIG. 12 may be implemented using a sliding puck, such as sliding puck 500 described with respect to FIGS. 3 through 10. The process shown in FIG. 12 may be implanted by persons or by one or more machines.

The process 1200 begins with forming an assembly 308 by removably attaching a sliding puck, such as sliding puck 500, to each leg of a seat assembly (operation 1202). The assembly 308 is positioned for installation into a vehicle (operation 1204). The sliding puck is removed from each leg of the seat assembly (operation 1206). The process terminates thereafter.

The flowcharts and block diagrams in the different depicted advantageous embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the advantageous embodiments provide for a device comprising a base, and a coupler connected to the base and adapted to attach the base to an aircraft passenger seat assembly. This device may be referred to as a sliding puck, such as sliding puck 500 shown in the figures.

The sliding pucks described herein provide a number of advantages over known means for moving objects, such as heavy aircraft seat assemblies. For example, the sliding pucks described herein may provide stable support for the seat assemblies during transport. Sliding pucks may allow the seat assemblies to be maneuvered on carpeted floors or other surfaces depending on the bottom configuration of the puck with reasonable ease and speed without exceeding desired floor loads. The sliding pucks described herein also may provide for easy maneuverability in small, confined spaces. Furthermore, because the sliding pucks described herein may be relatively small relative to the seat assemblies being moved, these sliding pucks may allow seat assemblies to be moved relatively easily through passenger doors on an aircraft.

The description of the advantageous embodiments have been presented for purposes of illustration and description, and is not intended to be exhaustive or limited to the illustrative advantageous embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A method of transporting an aircraft seat assembly comprising:
    forming an assembly by removably attaching a separate sliding puck to each leg of the seat, wherein one or more sliding pucks are attached to the seat and wherein at least one or more of the sliding pucks comprises a lockable sliding puck comprising:
        a first magnet connected to a slider assembly attached to the lockable sliding puck; and
        a second magnet connected to a piston attached to the lockable sliding puck, the second magnet having a same polarity as the first magnet, wherein in a first position the first magnet forces the piston in a track and locks the lockable sliding puck, and wherein in a second position the first magnet forces the second magnet to move and force the piston out of the track and unlock the lockable sliding puck;
    transporting the seat assembly to a location of installation on the aircraft; and
    removing the one or more sliding pucks, wherein removing includes moving the first magnet into the second position.

2. The method of claim 1 further comprising:
    shipping the seat assembly to a destination comprising a point of installation onto an aircraft.

3. The method of claim 2 further comprising:
    positioning the seat assembly for installation into the aircraft.

4. The method of claim 3, wherein the sliding pucks facilitate movement of the seat assembly within the aircraft.

5. The method of claim 1, wherein transporting the seat assembly comprises a human manually sliding the seat assembly along a surface.

6. The method of claim 1, wherein each leg of the seat comprises a stud and wherein each of the one or more lockable sliding pucks comprises a base comprising a material suitable for sliding along a surface, a frame connected to the base, the track connected to the frame, the track configured to hold the stud, and the pistons that is configured to move into the track, and wherein removably attaching further comprises:
    moving the piston into the track such that the stud is prevented from moving out of the track.

7. A method of transporting a seat assembly within a vehicle comprising:
    forming an assembly by removably attaching a sliding puck to each leg of the seat, wherein at least one of the one or more sliding pucks comprises a lockable sliding puck comprising:
        a first magnet connected to a slider assembly attached to the lockable sliding puck; and
        a second magnet connected to a piston attached to the lockable sliding puck, the second magnet having a same polarity as the first magnet, wherein in a first position the first magnet forces the piston in a track and locks the lockable sliding puck, and wherein in a second position the first magnet magnetically forces the second magnet to move and force the piston out of the track and unlock the lockable sliding puck;
    positioning the seat assembly to a location of installation into a vehicle; and
    removing the sliding puck from each leg of the seat assembly, wherein removing includes moving the first magnet into the second position.

8. The method of claim 7 wherein the sliding pucks facilitate movement of the seat assembly within the vehicle.

9. The method of claim 7 further comprising:
    positioning the seat assembly for installation into the vehicle.

10. The method of claim 9, wherein positioning the seat assembly comprises a human manually sliding the seat assembly along a surface.

11. The method of claim 7, wherein each leg of the seat comprises a stud and wherein each of the one or more lockable sliding pucks comprises a base comprising a material suitable for sliding along a surface, a frame connected to the base, the track connected to the frame, the track configured to hold the stud, and the pistons that is configured to move into the track, and wherein removably attaching further comprises:
    moving the piston into the track such that the stud is prevented from moving out of the track.

* * * * *